United States Patent [19]

Brosilow

[11] Patent Number: 5,191,521
[45] Date of Patent: Mar. 2, 1993

[54] MODULAR MULTIVARIABLE CONTROL APPARATUS AND METHOD

[75] Inventor: Coleman B. Brosilow, Cleveland Heights, Ohio

[73] Assignee: ControlSoft, Inc., South Euclid, Ohio

[21] Appl. No.: 539,902

[22] Filed: Jun. 18, 1990

[51] Int. Cl.⁵ .............................................. G06F 15/46
[52] U.S. Cl. ................................. 364/160; 364/149; 364/158; 364/176; 364/177; 364/172
[58] Field of Search ............................... 364/148–152, 364/157, 158, 159, 160–165, 176, 177, 183, 180, 172; 318/561, 632

[56] References Cited

U.S. PATENT DOCUMENTS

| | | | |
|---|---|---|---|
| 3,601,588 | 8/1971 | Bristol, II | 364/165 X |
| 3,628,116 | 12/1971 | Preikschat | 364/163 X |
| 3,671,725 | 6/1972 | Bakke | 364/151 |
| 4,563,735 | 1/1986 | Hirol et al. | 364/160 |
| 4,814,968 | 3/1989 | Fukumoto | 364/150 |
| 4,860,215 | 8/1989 | Seraji | 364/165 |
| 4,868,754 | 9/1989 | Matsumoto | 364/150 X |

*Primary Examiner*—Joseph Ruggiero
*Attorney, Agent, or Firm*—Renner, Otto, Boisselle & Sklar

[57] ABSTRACT

A method of controlling a process including at least two process variables and at least two control efforts, with each control effort having an influence on at least one process variable, including the steps of modelling the influence that a change in each control effort has on each process variable; describing the desired trajectory which each process variable will follow towards its desired value in response to a system change; and, coupling the control of each process variable; whereby changing a first set of at least one control efforts so as to cause a desired change in at least one process variable can be compensated for by a change in a second set of at least one control efforts so that substantially no influence in exhibited on other process variables in the system in which no change is desired. The method may include delaying a desired change in such first set of control efforts a time equal to the maximum dead time lapse of any control effort of such second set of control efforts relative to any such process variable for which no change in desired.

18 Claims, 3 Drawing Sheets

MODULAR MULTIVARIABLE CONTROL APPARATUS AND METHOD

TECHNICAL FIELD OF THE INVENTION

The invention relates generally to a method and apparatus for controlling a process, function, or the like, and, more particularly, to an interconnection of single process variable, multiple control effort controllers.

BACKGROUND OF THE INVENTION

There are many known controllers for affecting the control of a process, system, function, or the like (hereinafter, process). Examples of such controllers or control methodologies are Dynamic Matrix Control, Model Algorithmic Control, IDCOM, QDMC and others. While these controllers may provide effective control of a process, they tend to be difficult to implement and to tune for effective control of the process. These difficulties increase dramatically as the complexity of the system and the number of process variables to be controlled increases.

Typically a process may be thought of as having certain outputs, called process variables, and one or more ways of controlling the elements that produce this output, called control efforts. For example, in a heat exchanger system having two steam inputs to control the production of heated water, the temperature of the heated water is the process variable and the steam inputs are the control efforts.

Conventional methods of controlling a process having a number of process variables take the aggregate approach of controlling all of the process variables through the multiple control efforts as one interrelated, combined function. In order to effectively control the process variables through the multiple control efforts without undesirable overshoot of the process variables or system instability, the aggregate control system must be tuned at once as one function. As the complexity of the system or process grows, the tuning of the controller becomes inordinately complicated and the actual functioning of the controller becomes increasingly computationally intensive; often to the point that the system response must be slowed to accomplish the task.

It would be desirable to provide a method of controlling a process that is easy to implement and tune, and that could provide fast and effective control of the process.

SUMMARY OF THE INVENTION

The multivariable modular controller of the present invention, through the use of individualized coordinated controllers which each control one process variable, allows a system containing multiple process variables to be easily and effectively implemented and tuned, while effectively controlling the process.

In accordance with one aspect of the present invention, a method of controlling a process variable through at least two control efforts, includes measuring a disturbance of the process variable from a desired value; determining the dead time interval between the change of a control effort and a change in the process variable for each control effort; changing at least one control effort to at least partly compensate for the disturbance in the short term; changing at least one control effort to at least partly compensate for the disturbance in the long term; and returning the control efforts changed to compensate in the short term to their nominal values after the control efforts changed to compensate in the long term have compensated for the disturbance.

In accordance with another aspect, a method of controlling a process including at least two process variables and at least two control efforts, with each control effort having an influence on at least one process variable, including the steps of modelling the influence that a change in each control effort has on each process variable; describing the desired trajectory which each process variable will follow towards its desired value in response to a system change; and, coupling the control of each process variable; whereby changing a first set of at least one control efforts so as to cause a desired change in at least one process variable can be compensated for by a change in a second set of at least one control efforts so that substantially no influence in exhibited on other process variables in the system in which no change is desired. The method may include delaying a desired change in such first set of control efforts a time equal to the maximum dead time lapse of any control effort of such second set of control efforts relative to any such process variable for which no change in desired.

These and other objects, advantages, features and aspects of the present invention will become apparent as the following description proceeds.

To the accomplishments of the foregoing and related ends, the invention, then, comprises the features hereinafter fully described in the specification and particularly pointed out in claims, the following description and the annexed drawings setting forth in detail a certain illustrative embodiment of the invention, this being indicative, however, of but one of the various ways in which the principals of the invention may be employed. It will be appreciated that the scope of the invention is to be determined by the claims and the equivalents thereof.

DETAILED DESCRIPTION OF THE INVENTION

Figure 1A:
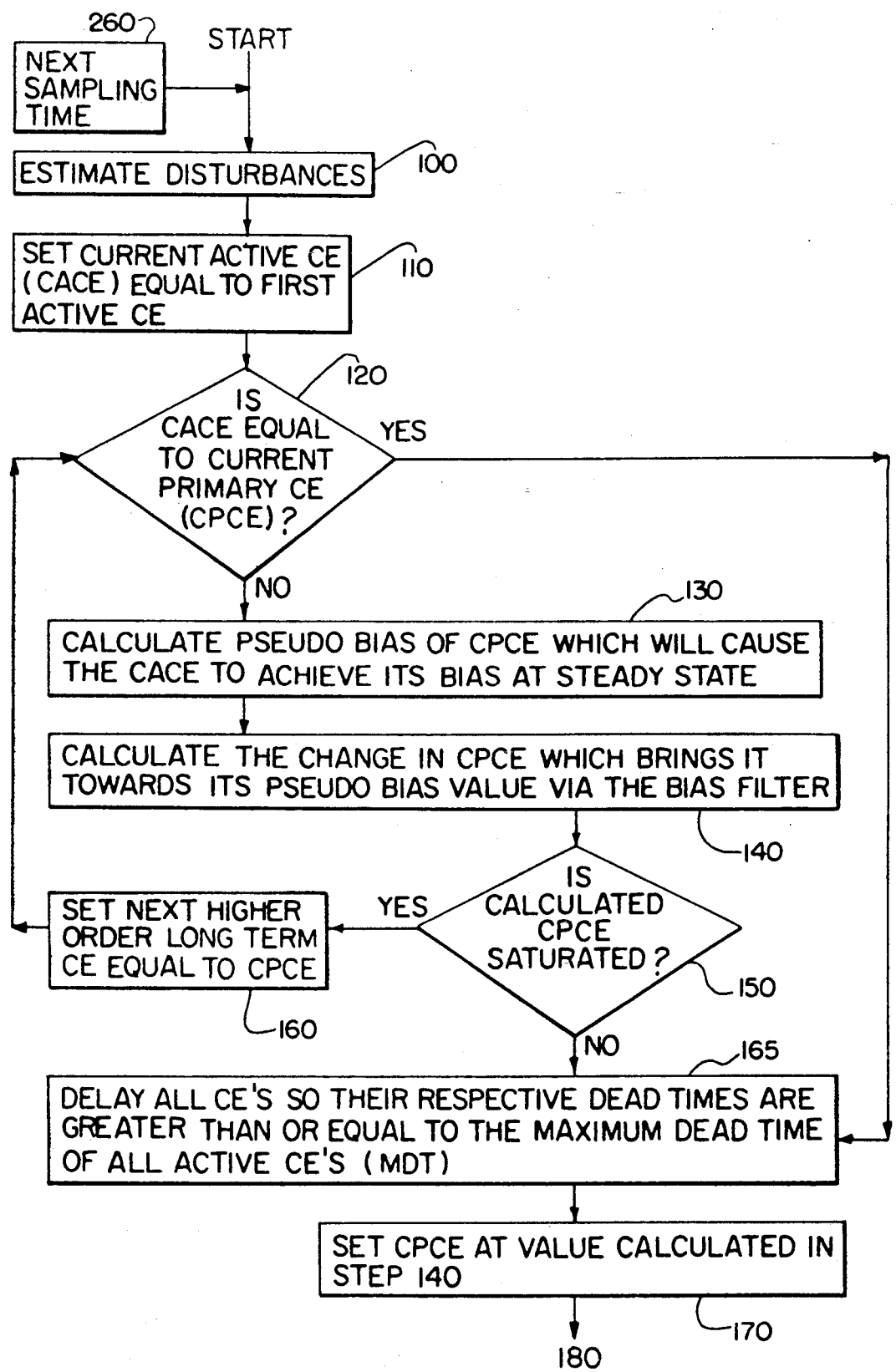
FIGS. 1a and 1b are flowcharts illustrating the steps taken by an exemplary coordinated controller of the modular multivariable controller of the present invention in response to a change in the detected value of the process variable.

A modular multivariable control (MMC) system is an interconnection of one or more individual controllers, called coordinated controllers. Each coordinated controller effects the control of one process variable in a process through any number of control efforts. Consequently, if there are, say, three process variables to be monitored and controlled in a process, there will be three interconnected coordinated controllers making up the MMC system which controls that process.

Since the MMC system is composed of individual coordinated controllers, it is advantageous to examine the properties of an exemplary individual coordinated controller in-depth. Each coordinated controller performs its functions in accordance with two classes of dynamic systems. The first class, called the process model, describes the effect of each control effort on the process variable. The second class of dynamic systems provides the desired response of the process variable to set point changes and disturbances for each control effort, and are referred to herein as filters.

The process model describes the influence that each control effort has upon the process variable, and the time period elapsed before that influence is reflected in the process variable. This time period from when a control effort is changed until a resultant effect is exhibited in the process variable is called the "dead time" for that control effort. Each control effort associated with a particular coordinated controller may, and ordinarily does, have a different respective dead time. For control efforts influencing a multiplicity of process variables, each will have a different model and a different dead time for each process variable influenced.

The above-mentioned filters describe how or along what trajectory the process variable will progress toward its desired value or condition, called its set point, given a change in the process, such as that due to a disturbance or a change in the set point. Each filter has a tuning parameter corresponding to its respective control effort which determines the rate at which the process variable will progress toward this set point. These tuning parameters accommodate modeling errors by matching the speed of response of the process variable to the expected modeling error. Large modeling errors require the associated response to be tuned to be relatively slow to prevent unstable or oscillatory responses to a disturbance or set point change. Conversely, small modeling errors permit tuning the response to be relatively fast, thus allowing a quick response to system changes.

Each control effort which influences the process variable is given a ranking which indicates its long term ordering relative to the other control efforts. The lowest order long term, or primary, control effort is that control effort which assumes the long term load necessary to maintain the process variable at its set point. Contributions to the long term load are made by the higher order, secondary, tertiary, etc., long term control efforts only if the primary has saturated, i.e., reached its limit. The primary control effort is preferably one that is easily and inexpensively supplied relative to the other control efforts.

Each control effort is also given a ranking which indicates its short term ordering relative to the other control efforts. The lowest order active control effort, or the first active control effort, is that which will respond towards the short term change, such as a change of set point or the entering of a disturbance, to drive the process variable to its set point. The higher order active control efforts, i.e., secondary active control, tertiary active control, etc., will be used to compensate for short term change only if the lower order active control (first active control) has saturated. In general, it is preferable to choose the first active control as the one that can force the process variable to respond most rapidly to set point changes and disturbances. Note, in some cases, it may be desirable to have two or more control efforts act simultaneously. In such a case these control efforts would be given the same active order number.

In the case where no control efforts have saturated, a coordinated controller having "n" associated control efforts is capable of maintaining the process variable at its respective set point while keeping $n-1$ control efforts at their desired values (in accordance with mathematical convention, the letter "n" represents any whole number). In general secondary and higher order long term control efforts are assigned desired nominal values at which they are maintained unless they are needed to suppress long term load disturbances or to achieve the desired set point. Each control effort further has a prescribed limit to which it can be adjusted from its nominal value. For example, if the control effort is a valve, the nominal value may correspond to a position where the valve is half open, and the limit would then correspond to that adjustment which would fully open or fully close the valve. Consequently, unless the primary control effort has been saturated, the secondary and higher order long term control efforts will be adjusted so as to reach their nominal values in the long term.

The first active control can be either the primary, secondary or higher order long term control effort. If it is the primary, then all other control efforts will be maintained at their nominal values. If the first active control is a secondary or higher order longer term control, when the first active control is adjusted to obtain the desired response for the process variable, the primary control will also be adjusted so that the first active control effort will eventually return to its desired nominal value.

By combining the respective influences of the individual control efforts, the process variable may be maintained at the chosen set point over both the short and long term irrespective of process disturbances. When a disturbance is detected in the process, such as through a decrease in the process variable, the first active control effort is adjusted to compensate for that decrease. The progressively higher priority active control efforts are also adjusted to compensate for the decrease only as lower order active control efforts become saturated. Concurrent with the adjustment of any lower order active control effort, the primary control effort is adjusted to compensate for the disturbance in the long term regardless of the short term adjustments made to the other control efforts. As time progresses and the primary control effort begins to exhibit its influence on the process variable, the lower order active control efforts initially used to compensate for the disturbance are returned to their nominal values.

Figure 1B:
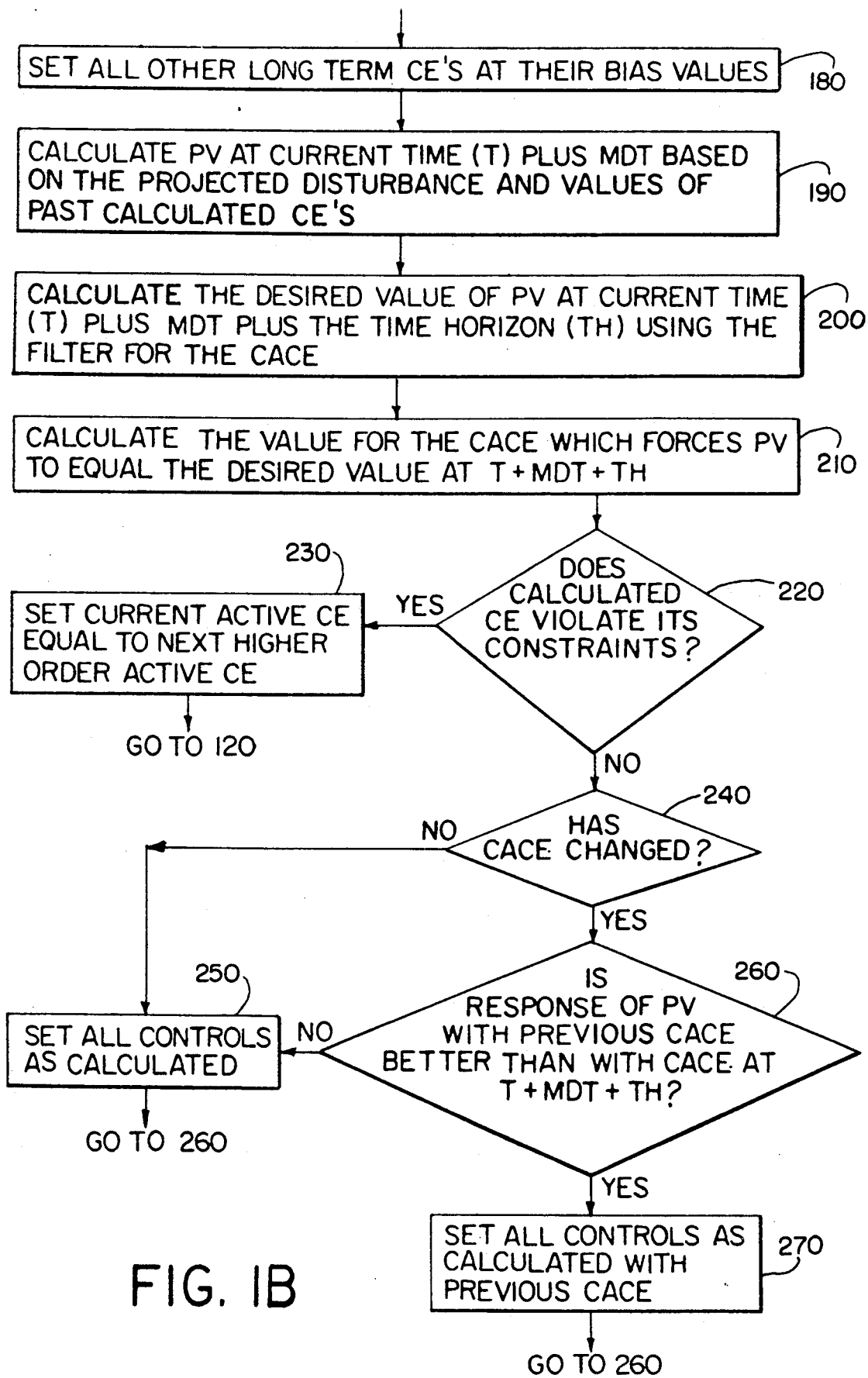

With reference now to the figures, the response of a coordinated controller to a disturbance or to a desired change in the set point of the corresponding process variable is shown in the flowchart of FIGS. 1a and 1b. Initially, the disturbance to be compensated for in the process must be determined. This can be done by either estimating the unmeasured disturbance in the process or estimating the effect of the unmeasured disturbance on the process variable (100). Estimating the unmeasured disturbance requires approximately inverting the process model to obtain the disturbances from the measurements. The estimated effect of the unmeasured disturbance on the process variable may be more easily obtained, however, by simply subtracting the current value of the process variable calculated by the process model from the detected process variable value. Note that if it is desired to change the set point to a different value, the disturbance is the difference between the detected process variable value and the new desired set point.

The next step is to compute the current values that all of the control efforts must assume at the current sampling time to compensate for the disturbance. The active control effort currently being calculated or the current active control effort (CACE), is selected as the lowest order active control which is not saturated (110).

It is then determined whether the CACE is also the lowest order long term control effort that has not been adjusted to saturation, or the current primary control effort (CPCE) (120). If not, then the value of the CPCE which will cause the current active control effort to achieve its bias value at steady state must be calculated using the corresponding process model (130). This value for the CPCE is called the pseudo bias value. Note that for the CPCE to allow the CACE to return to its steady state nominal value, the pseudo bias value must compensate for all long term process disturbances. The change in the CPCE which will cause it to progress towards that pseudo bias value in a stable manner is then calculated using the bias filter for the CPCE (140). If the calculated value for the CPCE saturates that control effort (150), then the next highest order long term control effort (LTCE) must also be used to provide long term compensation for the process disturbance. Accordingly, that LTCE is considered as the CPCE (160). The value that this next highest order long term control effort must be set to is determined from Steps 120 through 150, as described above. The changes in these long term control efforts thus provide the long term loading necessary to allow the CACE to return to its nominal value at steady state. Note that if the current active control effort is the current primary control effort, it is not necessary to calculate the pseudo bias for the CPCE (Steps 130-160).

Next, the effects of all of the control efforts are delayed to a point in the future equal to the maximum dead time of the set of control efforts including the current active control effort and all of the lower order active control efforts (T+MDT) (165). In this manner it is assured that the effects of a change in the nominal value (i.e., bias value) of an active control effort can be compensated for before the process variable is undesirably affected. The current primary control effort is then set at the value calculated above which will cause it to progress towards its pseudo bias value (170), and all other long term control efforts are also set to their bias values (180).

The value for the process variable is then projected T+MDT time units into the future using the process model (190). This projection is based on the projected disturbance estimate as well as the values of the past calculated control efforts. Note that disturbance estimate, or the effect of the unmeasured disturbance, is projected from the current time to this time in the future assuming that the disturbance and unknown future control effects will remain constant.

The desired value for the process variable is then calculated T+MDT time units into the future plus the next sampling time, or time horizon (TH), using the filter and tuning parameters associated with the current active control effort to assure a good response despite modeling errors (200). If the process model is perfect, i.e., there are no modeling errors, then the filter time constant is zero and the desired value for the process variable is that calculated in Step 190. If the process model relating the current active control effort to the process variable is a first order ordinary differential equation, then there is no need to project the desired process variable beyond one sampling time. However, if the model includes a second or higher order ordinary differential equation, then longer time horizons may be required (see, Coleman et al.. Adaptive Horizon Adjustment for Model Predictive Control, 1986 ACC Proceedings, Seattle, Wash., pp. 344-348; Coleman et al., A Linear Programming Approach to Constrained Multivariable Process Control, Control and Dynamic Systems, pp. 141-180, Leondes, Academic Press, 1987).

A change in the current active control effort which will force the process variable to equal the desired process variable at the time T+MDT+TH is then calculated (210). If the calculated CACE violates its constraints (220) i.e., must be adjusted beyond its limit, then the next higher order active control effort must also be adjusted to aid in forcing the process towards its desired value. Accordingly, the CAC is set to be the next higher order active control and the process is begun again from Step 120 to calculate the value for that active control (230).

If the calculated value for the current active control effort does not violate its constraints and the CACE is the first active control (240), then all controls are set as calculated (250) and the computation is complete until the next sampling time. If, however, the current active control effort is not the first active control, the algorithm determines whether the response of the process variable to the previous active control effort is better than with the current active control effort (260). If not, then all controls are set as calculated (250), and the entire process is then begun again at the next sampling time (260) It is possible, however, that even if an active control effort saturates that it will not be advisable to change the CACE to the next higher order active control. This situation is likely to occur if the dead time and filter time constant of the next higher order active control is sufficiently larger than the CACE so that the projected process variable calculated in Step 190 using the new CACE is further from the set point than that obtained with the current CACE saturated. In this case the next active control is not moved from its bias value, and the calculation is finished until the next sample time (260). The purpose of Steps 240 through 270 is to prevent control efforts from fighting each other, that is, when a lower order active control has saturated, the higher order active control effort will be changed only if it will move the process variable closer to the set point. As will be appreciated, this controller fighting logic can be done in different ways and in different places. For example, this can be done right after the calculation of the desired process variable (200) to make sure the desired process variable is better than the process variable computed with previous control efforts.

It will be appreciated by one skilled in the art that the process outlined in the flowchart is but one exemplary process which a coordinated controller might employ. For example, the steps of calculating the pseudo bias for the current primary control effort (Steps 130-160) may be removed from the overall loop and calculated separately with equivalent results. Such obvious modifications and other processes which provide equivalent results are within the scope of the present invention.

One advantage of the coordinated controller of the invention is that the nominal or bias value of a control effort can be changed without changing the value of the process variable. This is accomplished by inserting a sufficient delay in all controls s that the current active control effort can compensate for all bias changes. It is this feature that allows several coordinated controllers to be easily combined to form a modular multivariable controller.

Figure 2:
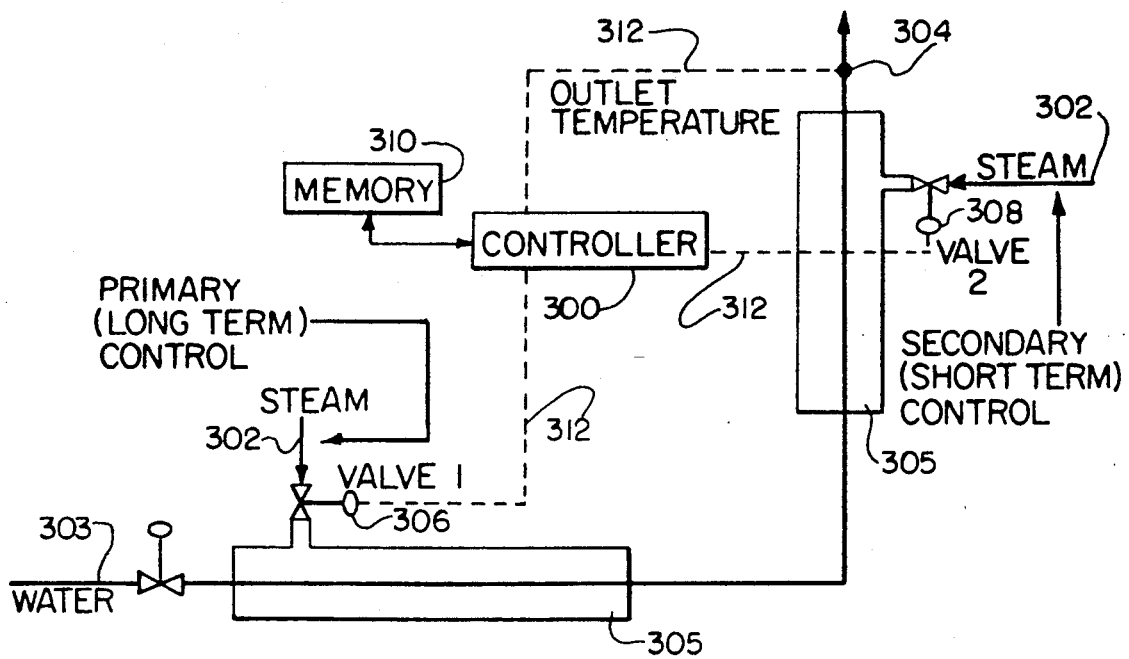
FIG. 2 is a schematic illustration of simple heat exchanger system having one process variable and one coordinated controller in accordance with the present invention.

With reference now to FIG. 2, an example of the invention implemented in a coordinated controller 300 for controlling one process variable through two control efforts is illustrated. The process is a typical heat exchanger for transferring heat from steam 302 to inlet water 303 to produce heated water 304. The temperature of the water 304 leaving the heat exchanger system is the process variable, and steam supplied to the heat exchange tubes 305 through the two pneumatically actuated steam valves, valve 1 and valve 2 (identified in FIG. 2 with reference numerals 306 and 308, respectively), are the control efforts through which the coordinated controller maintains the outlet temperature at its desired set point. Valve 1 (306) is the primary control effort, having a dead time relatively longer than valve 2 (308). Valve 2 (308) is the secondary and first active control effort. Consequently, steam 302 applied through valve 1 will be used to maintain the long term loading of the process necessary to keep the outlet temperature 304 at its set point. Steam 302 applied through valve 2 (308) Will be used to compensate only for short term disturbances of the outlet temperature unless valve 1 becomes saturated, i.e., is completely opened or closed.

A coordinated controller 300 which controls the air signal to valve 1 (306) and valve 2 (308) may be implemented in a variety of ways. One way is to use a commercially available microcomputer such as an IBM PC which interfaces with an electric to pneumatic transducer via a data acquisition and control (DAC) board. Process information such as the outlet temperature is provided to the DAC in the form of an analog signal. The microcomputer digitizes the signal and, through execution of the coordinated controller functions stored as executable code in memory 310, determines how the valves are to be set. The memory 310 may be random access memory, or read-only memory contained in the coordinated controller as appropriate chips or circuits, a hard disk, a floppy disk or any other suitable means, or resident as a separate peripheral. An appropriate electrical signal is then generated and provided to the transducer which produces a corresponding air signal to the valve being controlled, thus increasing or decreasing the steam provided to the heat exchanger as desired. The flow of information or control, such as an air signal between the coordinated controller and the outlet or the valves, is represented in the figure as dashed lines 312. Alternatively, the microcomputer and DAC could be replaced with a commercially available programmable multifunction controller or the like, such as that manufactured by Bailey Controls, or with an application module, such as that manufactured by Honeywell, which would execute the coordinated controller functions and provide outputs to the transducer directly.

In either case the coordinated controller functions are performed through the execution of a code written to perform a process such as outlined in FIGS. 1a and 1b. The type of code will, of course, be one compatible with the executing host, such as FORTRAN for a microcomputer, and given the flowcharts, the description above and a reasonable amount of time, could be written by one of ordinary skill in the art.

To develop the coordinated controller which will maintain the outlet temperature at the desired value, there is needed a process model that describes how each of the steam valves, valve 1 and valve 2, influences the outlet temperature, and a filter which describes the trajectory along which the outlet temperature will be driven toward its set point given a change in the process variable. For the process model assume that a 1 psi increase in the air actuation signal to valve 2 causes a one degree increase in the outlet temperature of the water after a dead time of one second. Similarly, assume that a 1 psi increase in the air actuation signal to valve 1 causes a two degree increase in the heat exchanger outlet temperature after a dead time of 10 seconds. The nominal, or bias, pressure for valve 2 is set at its midrange valve position of 9 psi. For the filter, assume that the heat exchanger model is perfect so that the filter can provide instantaneous response (i.e., the filter is a first order lag with a time constant of zero). In this case, the outlet temperature can achieve its set point after only one second. This is the fastest possible response with the delay being a function of the dead times of the control effects alone. It is apparent that this type of response can only be achieved if the process model is perfect, otherwise the control system will be unstable.

For the first example, assume a scenario in which it is desired to increase the outlet temperature to a new set point temperature which has been increased by one degree. Further assume that it is desired to bring the outlet temperature to the new set point as quickly as possible, and then to maintain the outlet temperature at this new set point. The coordinated controller will instantaneously increase the pressure to valve 2 by 1 psi (from 9 to 10 psi) while the pressure to valve 1 will be increased by ½ psi. Accordingly, after one second, the dead time for valve 2, the outlet temperature will increase by one degree since in the model a 1 psi increase in the pressure supplied to valve 2 causes a one degree increase in the water outlet temperature, and valve 1, which has a dead time of 10 seconds, has not yet begun to influence the outlet temperature. After 9 seconds the coordinated controller will return the pressure applied to valve 2 to its nominal pressure of 9 psi, since the dead time of valve 1 has expired and the influence of valve 1 on the output temperature will cause that temperature to increase one degree. While valve 2 has returned to its nominal value, valve 1 will remain at its increased value to maintain the outlet temperature at the new set point over the long term.

To accomplish this the coordinated controller performs the steps described above and outlined in the flowchart of FIG. 1. Since there are no disturbances in the system, the estimate from Step 100 will be zero. Next, the coordinator will determine that valve 2 has the shortest dead time, so no controls need be delayed. Since the secondary control effort (valve 2) is the active control effort, and the only other control effort is the primary, there are no other active control efforts to be set to their bias values. Similarly, the current active control effort (valve 2) is not the primary control effort (valve 1), and the pseudo bias value for valve 1 that will cause valve 2 to return to its desired value of 9 psi must be calculated.

In order that the active control effort (valve 2) eventually return to its bias value of 9 psi, it is necessary that valve 1 (the primary) move so as to eventually assume the longer term load caused by the increase in temperature of the set point. A steady state calculation shows that if the outlet temperature is to increase by one degree while valve 2 remains (ultimately) at 9 psi, valve 1 must ultimately increase its pressure by ½ psi (130). This increase would normally be filtered by a bias filter, whose time constant is selected to maintain a good, stable response of the process variable (i.e., outlet temperature) to set point changes, bias changes and disturbances (140). However, in the example the model is perfect, so the bias filter time constant is zero and the output of the controller will cause the pressure to valve I to increase instantaneously by ½ psi as soon as the new set point is entered.

Since it is assumed that the primary is not saturated by the ½ psi pressure increase, the next step in the method is to project the estimated disturbance at the current time plus the dead time of 1 second for valve 2. Since there are no disturbances, this estimate will be zero. The projected process variable, or outlet temperature, at the current time plus the 1 second dead time for valve is then calculated using the process model (190). Assuming that the exchanger was initially at steady state, the value for the outlet temperature will be the same as the initial value. The algorithm then calculates the desired value of the outlet temperature at the next sampling time, or 1½ seconds into the future (if the sampling interval is ½ second), using the control effort tuning parameter (200). Since the tuning parameter for both control efforts, valve 1 and valve 2, has been set to zero to obtain the fastest possible response, there is no response lag and the desired outlet temperature at this sample time will be its set point. The value of pressure supplied to valve 2 is then calculated to cause this increase to the outlet temperature at the sample time (210).

The value of the pressure supplied to valve 2 must be maintained at 10 psi to achieve this desired output temperature. This is the current value to which valve 2 must be set to affect a one degree change in the output temperature one second into the future. The algorithm then checks whether valve 2 has been adjusted beyond its limit (220). Since the nominal pressure for valve 2 is 9 psi which is in the mid-range of its, say, 10 psi range, a 1 psi change does not surpass its limit. Thus, valve 2 is set to its calculated value.

The algorithm then determines whether the values for all of the control efforts have been calculated. Since they have, all controls applied and held until the next sampling time. At the next sampling instant there are no disturbances and no changes in set point or bias values so values of the pressures sent to valves 1 and 2 will remain unchanged. This situation continues until nine second have elapsed. Again, since there has been no set point or bias change, and no disturbance, the pressure sent to valve 1 remains unchanged. However, when the process variable is again calculated, the calculation will show that the process variable will increase to one degree *above* its set point (due to the previous action of valve 1) unless the pressure to valve 2 is decreased by one psi back to 9 psi (190). Since the filter time constant is zero, the desired process variable, or outlet temperature, is exactly the set point (200) and the outlet pressure to valve 2 will be calculated to cause valve 2 to drop back to 9 psi (210). Future calculations will not change the valve pressures unless there is either a new set point change, a new bias value or a disturbance in the outlet temperature.

Consider a second example in which it is desired to change the nominal value for valve 2 from 9 to 10 psi while maintaining the outlet temperature at its set point. In this case, the coordinated controller will decrease the pressure to valve 1 instantaneously to ½ psi to compensate for a future change in the nominal value for valve 2. Since the time it takes for a change in valve 1 to effect the outlet temperature is greater than the time that it takes for valve 2 to effect the outlet temperature, valve 2 will not be changed to its new nominal value until a time in the future equal to the dead time for valve 1 minus the dead time for valve 2 (i.e., 10-1). Consequently, after 9 seconds, the coordinated controller will increase the pressure to valve 2 to 10 psi, compensating for the decrease in valve 1 which will take effect one second into the future. The coordinated controller thus maintains the outlet temperature at its set point throughout the entire time period despite the change in the nominal value of a control effort.

This ability to manipulate the nominal values of the control efforts without influencing the associated process variables allows any number of coordinated controllers to be combined to form the modular multivariable controller of the present invention. Since each coordinated controller is responsible for the control of only one process variable, multiple coordinated controllers may be coupled without losing the ability to easily tune and optimize each controller individually.

When implementing a controller to control a process having multiple process variables, the engineer can easily determine which process variable is the most critical to be controlled accurately and then rank the remaining process variables according to their criticality. The coordinated controllers of the MMC will be implemented in accordance with this ranking. Consequently, the coordinated controller responsible for the most critical process variables will be tuned first to optimize the control of that process variable. The other coordinated controllers will then be tuned in the order of criticality of their associated process variables.

Figure 3:
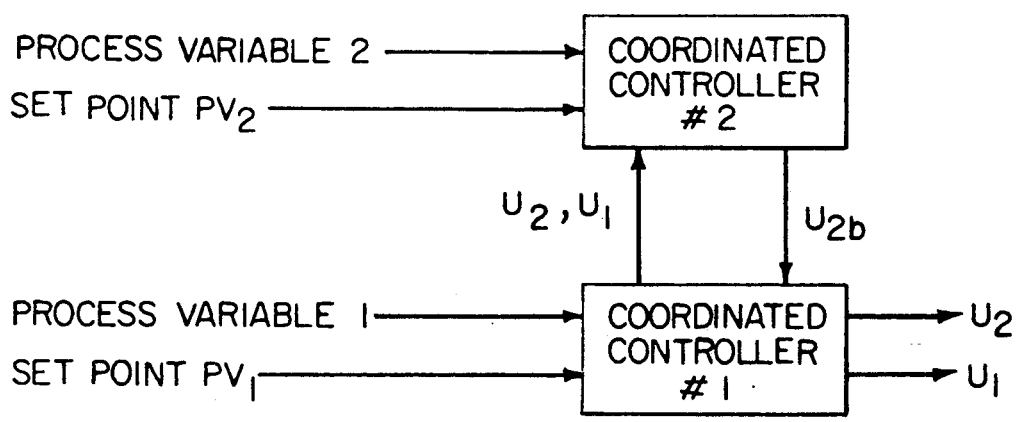
FIG. 3 is a schematic illustration of a modular multivariable controller including two coordinated controllers.

Referring to FIG. 3, there is shown an example of a simple modular multivariable controller. As illustrated, the modular multivariable controller includes two coordinated controllers, CC1 and CC2, each responsible for the control of one process variable, $PV_1$ and $P_2$, respectively. Coordinated controller CC2 controls $PV_2$ through the control effort $U_{2b}$ (the bias for the secondary control in coordinated controller CC1). Coordinated controller CC1 controls $PV_1$ through the manipulation of two control efforts, $U_1$ and $U_2$.

As an example of the interrelation of the coordinated controllers, assume that it is desired to elevate the set point of process variable $PV_2$ a certain amount. Coordinated controller CC2 can influence $PV_2$ only through manipulation of $U_{2b}$. When coordinated controller 1 sees a change in $U_{2b}$, it will move $U_2$ towards $U_{2b}$ and move $U_1$ so as to maintain $PV_1$ constant. Thus, a change in $U_{2b}$ causes (through CC1) a change in $U_1$ and $U_2$ and, hence, a change in $PV_2$. Coordinated controller CC2 uses knowledge of how a change in $U_{2b}$ influences $PV_2$, without affecting $PV_1$, to adjust $U_{2b}$ so as to cause the process variable $PV_2$ to follow the prescribed trajectory to bring it to set point as quickly as possible within an acceptable overshoot. This value of $U_{2b}$ is transferred to coordinated controller CC1.

Concurrent with coordinated controller CC2 affecting a change in $U_{2b}$, coordinated controller CC1 will make any adjustments to its control efforts necessary to maintain process variable $PV_1$ as constant or near constant. For the purposes of this example, control effort $U_1$ is both the primary and active control effort. Accordingly, as $U_2$ progresses toward its nominal value of $U_{2b}$ (to bring process variable $PV_2$ to its new set point) $U_1$ is adjusted to compensate for the change in $U_2$ both immediately and in the long term.

The interrelationship between coordinated controller CC1 and coordinated controller CC2 can be expressed in a Laplacian format by the following equations:

$$Y_1(S) = g_{11}(S)U_1(S) + g_{12}(S)U_2(S) + d_1 \qquad (1)$$

$$Y_2(S) = g_{21}(S)U_1(S) + g_{22}(S)U_2(S) + d_2 \qquad (2)$$

where:
$Y_1$ = Process variable $PV_1$
$Y_2$ = Process variable $PV_2$
$g_{11}$ = Transfer function modeling the influence that control effort $U_1$ will have on $PV_1$ and the dead time before that influence is exhibited on $PV_1$
$g_{12}$ = Transfer function modeling the influence that control effort $U_2$ will have on $PV_1$ and the dead time before that influence is exhibited on $PV_1$
$g_{21}$ = Transfer function modeling the influence that control effort $U_1$ will have on $PV_2$ and the dead time before that influence is exhibited on $PV_2$
$g_{22}$ = Transfer function modeling the influence that control effort $U_2$ will have on $PV_2$ and the dead time before that influence is exhibited on $PV_2$
$d_1$ = The disturbance effect on $PV_1$
$d_2$ = The disturbance effect on $PV_2$ Equation 1 thus models the influence that the control efforts $U_1$ and $U_2$ will have on the process variable controlled by CC1, or process variable $PV_1$, as well as the dead time that elapses before a change in a control effort is exhibited on the process variable. Likewise, Equation 2 models the influence that control efforts $U_1$ and $U_2$ have on the process variable controlled by coordinated controller CC2, or process variable $PV_2$, as well as their associated dead times.

Equation 1 and Equation 2 thus provide a completely coupled control process between coordinated controllers CC1 and CC2. Note that the transfer functions $g_{11}$, $g_{12}$, $g_{21}$ and $g_{22}$ can be, and probably are, different differential delay equations so that an equal change in each control effort will have a different impact at different times on each process variable.

Next, a filter equation is necessary which will model the trajectory that each process variable will take in progressing towards its desired value o set point in response to a change in the set point or a disturbance.

$$Y_1 - d_1 = \frac{Y_{1sp} - d_1}{e_1 S + 1} e^{-S\theta_{1i}} \quad i = 1,2 \qquad (3)$$

$$Y_2 - d_2 = \frac{Y_{2sp} - d_2}{e_2 S + 1} e^{-S\theta_2} \qquad (4)$$

where:
$Y_{1sp}$ = The set point of process variable $PV_1$
$Y_{2sp}$ = The set point of process variable $PV_2$
$\theta_{1i}$ = The dead time between control effort $U_i$ and $PV_i$
$\theta_2$ = The dead time between $U_{2b}$ and $PV_2$ The first order transfer functions in Equations 3 and 4 are simple representative transfer functions describing how the process variable will progress towards its set point. It will be apparent to one of ordinary skill in the art that in practice a transfer function of the appropriate order and form would be chosen to adequately describe the desired response of the process variable in an actual control system.

To determine the value that the control effort $U_1$ must assume at a certain point in time to compensate for the desired change in the nominal value of control effort $U_2$ within the constraints of the response of $PV_1$, Equation 1 is set equal to Equation 3; where $i=1$ since $U_1$ is the active control:

$$g_{11}(S)U_1(S) + g_{12}(S)U_2(S) = \frac{Y_{1sp} - d_1}{e_{11}S + 1} e^{-S\theta_{11}} \qquad (5)$$

solving Equation 5 for the control effort $U_1$ yields:

$$U_1(S) = g_{11}^{-1}(S)\left\{ \frac{Y_{1sp} - d_1}{(e_{11}S + 1)} e^{-S\theta_{11}} - g_{12}(S)U_2(S) \right\} \qquad (6)$$

Equation 6 thus provides a model of the values that control effort $U_1$ must assume to compensate for changes in control effort $U_2$ so as to maintain process variable $PV_1$ at its set point.

A coordinated controller automatically ensures that the active control effort ($U_1$, in the example) can be adjusted to compensate for any changes in the secondary effort ($U_2$) due to bias changes. It does this by adding whatever delay is necessary between a change in bias and a change in the associated control effort. Mathematically this can be expressed as $$U_2(S) = g_{2b}(S)U_{2b}(S) \qquad (7)$$

where $$g_{2b}(S) = e^{-S\phi}$$

with $$\phi = 0 \text{ if } \theta_{11} < \theta_{12}$$

and $$\theta = \theta_{11} - \theta_{12} \text{ if } \theta_{11} > \theta_{12}$$

Substituting Equation 7 into Equation 6 yields:

$$U_1(S) = g_{11}^{-1}(S)\left\{ \frac{Y_{1sp} - d_1}{(e_{11}S + 1)} e^{-S\theta_{11}} - g_{12}(S)g_{2b}(S)U_{2b}(S) \right\} \qquad (8)$$

Which provides an equation which describes how the control effort $U_1$ of coordinated controller CC1 will respond to a change in the nominal value of control effort $U_2$, or $U_{2b}$, to maintain the process variable $PV_1$ at its set point. The control effort $U_2$ will respond to a change in its nominal value $U_{2b}$ according to Equation 7. Substituting Equation 7 and Equation 8 into Equation 2 then provides one equation relating control effort $U_{2b}$ to $Y_2$, or the process variable $PV_2$. Finally, recalling Equation 4, an expression is provided through which the coordinated controller CC2 selects the value of $U_{2b}$ to cause the process variable $PV_2$ to progress to its new set point.

Note that a similar procedure to the above would be used if three process variables were to be controlled. In such a case a third coordinated controller would be added with its associated control efforts and a set of equations similar to Equations 1 and 2 with additional terms for the added control efforts and a third equation for the third process variable would be developed coupling all three coordinated controllers together. This could be expanded for any number of process variables and associated coordinated controllers, while maintaining the ease of tuning and optimal control of the coupled process since each coordinated controller still controls only one process variable.

In the MMC calculation the lower order coordinated controllers will be used more than once. As the number of process variables increases, an analytical evaluation of the model for high order coordinated controller (e.g., relating $PV_2$ to $U_{2b}$) gets rather complicated. However, computationally, the model for higher order coordinated controllers can be obtained easily as described below:

1. Keep the first coordinated controller closed-loop (i.e., keep the process variable of the first coordinated controller constant).
2. Increase the value of the first active control effort in the second coordinated controller by a step while keeping all other control efforts constant. Record the response of the process variable controlled by the second coordinated controller.
3. Repeat Step 2 for all active control efforts in the second coordinated controller.
4. After obtaining the model for the second coordinated controller, keep both first and second coordinated controllers closed-loop (Keep both process variables constant). Proceed with Steps 1-3 to calculate the model for the third coordinated controller.
5. This procedure is repeated, keeping all lower order coordinated controllers closed-looped, until models for all higher order coordinated controller are calculated.

As will be appreciated from the above, the modular multivariable controller of the present invention may be extended to control any number of process variables through any number of control efforts while maintaining its modular nature and computational simplicity. Further, while the coordinated controller described herein is preferred, other coordinated controllers providing similar functions could be coupled using the modular multivariable controller methodology to provide equivalent results.

What is claimed is:

1. A method of controlling a process variable through at least two control efforts, comprising the steps of:
    a) measuring a disturbance of the process variable from a desired value;
    b) determining the dead time interval between the change of a control effort and a change in the process variable for each such control effort;
    c) changing at least one such control effort to at least partly compensate for such disturbance in the short term;
    d) changing at least one such control effort to at least partly compensate for such disturbance in the long term; and
    e) returning such control efforts changed to compensate in the short term to their original values after such control efforts changed to compensate in the long term have compensated for such disturbance.

2. The method of claim 1, wherein each such control effort is ranked according to the priority in which it will be changed to provide the relatively long term loading necessary to maintain the process variable at its desired value at steady state.

3. The method of claim 2, wherein each such control effort is changed to provide the long term loading necessary to maintain the process variable at its desired values in the order of its priority.

4. The method of claim 3, wherein lesser long term priority control effects are used to maintain the process variable at its desired value only when all higher long term priority control efforts have been saturated.

5. The method of claim 1, wherein each such control effort is ranked according to the priority in which it will be changed to provide the relatively short term loading necessary to maintain the process variable at its desired value.

6. The method of claim 5, wherein each such control effort is changed to provide the short term loading necessary to maintain the process variable at its desired values in the order of its priority.

7. The method of claim 6, wherein lesser short term priority control effects are used to maintain the process variable at its desired value only when all higher short term priority control efforts have been saturated.

8. A method of controlling a process including at least two process variables and at least two constrained control efforts, with each control effort having an influence on at least one such process variable, comprising the steps of:
    a) modelling the influence that a change in each such control effort has on each such process variable;
    b) describing the desired trajectory which each such process variable will follow towards its desired value in response to a system change;
    c) ranking each such control effort relative to each such process variable according to the priority in which it will be changed;
    d) coupling the control of each such process variable;
    e) changing an unsaturated control effort of highest rank of a first set of at least one control effort to compensate for a disturbance to a process variable until such disturbance is compensated for or until such highest ranked control effort is saturated, then changing a next highest ranked control effort of the first set until such disturbance is compensated for; and,
    f) changing at least one control effort of a second set of at least one control effort so as to compensate for changes in said first set of at least one control efforts such that substantially no influence is exhibited on other process variables in the system in which no change is desired.

9. The method of claim 8, wherein said step of modelling includes modelling the dead time lapse before such influence is exhibited in each such process variable after a change in each such control effort.

10. The method of claim 9, wherein said step of coupling includes delaying a desired change in such first set of control efforts a time equal to the maximum dead time lapse of any control effort of such second set of control efforts relative to any such process variable for which no change in desired.

11. The method of claim 10, wherein each such control effort is ranked relative to each process variable according to the priority in which it will be changed to provide the relatively long term loading necessary to maintain each process variable at its desired value at steady state.

12. The method of claim 11, wherein each such control effort is ranked relative to each process variable according to the priority in which it will be changed to provide the relatively short term loading necessary to maintain each process variable at its desired value.

13. The method of claim 12, wherein such control efforts with high short term priorities are returned to their original values once such control efforts with high long term priorities have compensated for any loading contributions to the process made by such short term priority control effects.

14. The method of claim wherein such ranking generally corresponds to the respective dead times for each control effort, with higher long term priority control effects generally having longer dead times than lesser long term priority control effects.

15. The method of claim 12, wherein such ranking generally corresponds to the respective dead times for each control effort, with higher short term priority control effects generally having shorter dead times than lesser short term priority control effects.

16. The method of claim 8, wherein such process variables are ranked in accordance with the relative importance of their effective control.

17. The method of claim 16, wherein such second set of control efforts are not changed to compensate for the effects of a change in such first set of control efforts if such a change in such second set adversely affects the control of a higher ranked process variable.

18. An apparatus for controlling a process including at least two process variables ranked in accordance with the relative importance of their control and at least two control efforts for controlling said process variables, comprising:
  means for measuring the values of each process variable;
  means for effecting a change in the value of at least one control effort of a first set of control efforts to compensate for a disturbance to a first process variable; and
  compensating means for compensating for the effects that a change in said first set of control efforts has on other process variables by effecting a change in at least one control effort of a second set of control efforts and for delaying or prohibiting changes to said first set of control efforts until compensation for any higher ranked process variables can be initiated.

* * * * *